US00RE44832E

(19) United States
(12) Reissued Patent
Headrick

(10) Patent Number: US RE44,832 E
(45) Date of Reissued Patent: Apr. 8, 2014

(54) RIDGE VENTILATION SYSTEM

(75) Inventor: J. Charles Headrick, Hiawassee, GA (US)

(73) Assignee: Building Materials Investment Corporation, Dallas, TX (US)

(21) Appl. No.: 10/694,590

(22) Filed: Oct. 27, 2003

Related U.S. Patent Documents

Reissue of:
(64) Patent No.: 6,371,847
Issued: Apr. 16, 2002
Appl. No.: 09/825,033
Filed: Apr. 2, 2001

U.S. Applications:
(63) Continuation of application No. 09/412,909, filed on Oct. 5, 1999, now Pat. No. 6,227,963.

(51) Int. Cl.
*F24F 7/02* (2006.01)

(52) U.S. Cl.
USPC ..... 454/365; 52/94

(58) Field of Classification Search
USPC ..... 52/94, 95, 198, 199; 454/260, 365, 366; 206/231, 338, 482, 347, 488
See application file for complete search history.

(56) References Cited

U.S. PATENT DOCUMENTS

| | | | | | |
|---|---|---|---|---|---|
| 1,431,869 | A | * | 10/1922 | Bergen | 206/231 |
| 1,717,728 | A | | 6/1929 | Moore | |
| 1,745,315 | A | * | 1/1930 | Parker | 206/231 |
| 1,953,062 | A | * | 4/1934 | Conway | 206/231 |
| 2,214,183 | A | | 9/1940 | Seymour | 108/8 |
| 2,278,524 | A | * | 4/1942 | Parker | 206/338 |
| 2,799,214 | A | | 7/1957 | Roose | 98/42 |
| 2,868,104 | A | | 1/1959 | Honholt et al. | 98/42 |
| 3,029,933 | A | * | 4/1962 | Sutter | 206/577 |
| 3,080,683 | A | * | 3/1963 | Sallie | 206/324 |
| 3,185,070 | A | | 5/1965 | Smith | 98/42 |
| 3,224,154 | A | * | 12/1965 | Toti et al. | 52/520 |
| 3,236,170 | A | | 2/1966 | Meyer et al. | 98/42 |
| 3,247,631 | A | * | 4/1966 | Lovness | 52/518 |
| 3,481,263 | A | | 12/1969 | Belden | 98/42 |
| 3,625,134 | A | | 12/1971 | Smith | 98/42 |
| 3,660,955 | A | | 5/1972 | Simon | 52/420 |

(Continued)

FOREIGN PATENT DOCUMENTS

| | | | | | |
|---|---|---|---|---|---|
| JP | 05179742 | A | * | 7/1993 | E04B 5/02 |

OTHER PUBLICATIONS

Declaration of J. Charles Headrick, dated Dec. 12, 2012.

*Primary Examiner* — Steven B McAllister
*Assistant Examiner* — Samantha Miller
(74) *Attorney, Agent, or Firm* — Womble Carlyle Sandridge & Rice, LLP

(57) ABSTRACT

A ridge ventilation system includes a plurality of ridge vent sections joined together in end-to-end relationship covering the open ridge of a roof. Each ridge vent section has a laterally flexible central panel flanked by ventilation grids and wind baffles. Attachment means are formed on the ends of each ridge vent section for attaching the sections together and a drain trough on one end of each ridge vent section is configured to underlie the junction between two attached ridge vent sections to drain water that may seep into the junction away from the open ridge of the roof. Buttresses that support the wind baffles are configured to hold nails for use in attaching each section to a roof.

13 Claims, 8 Drawing Sheets

(56) References Cited

U.S. PATENT DOCUMENTS

| | | | | | |
|---|---|---|---|---|---|
| 3,949,657 | A | | 4/1976 | Sells | 98/42 A |
| 4,073,106 | A | | 2/1978 | Malott | 52/199 |
| 4,080,083 | A | | 3/1978 | Malott | 403/305 |
| 4,083,448 | A | * | 4/1978 | Zampini et al. | 206/488 |
| 4,280,399 | A | | 7/1981 | Cunning | 98/42 A |
| 4,325,290 | A | | 4/1982 | Wolfert | 98/42 A |
| 4,484,424 | A | | 11/1984 | Logsdon | 52/199 |
| 4,520,713 | A | | 6/1985 | Arfsten | 98/42.19 |
| 4,545,291 | A | * | 10/1985 | Kutsch et al. | 454/365 |
| 4,550,648 | A | | 11/1985 | Eagle | 98/37 |
| 4,554,862 | A | | 11/1985 | Wolfert | 98/42.21 |
| 4,555,982 | A | | 12/1985 | Goubaud | 98/718 |
| 4,607,566 | A | | 8/1986 | Bottomore et al. | 98/37 |
| 4,643,080 | A | | 2/1987 | Trostle et al. | 98/42.21 |
| 4,676,147 | A | | 6/1987 | Mankowski | 98/42.21 |
| 4,782,743 | A | | 11/1988 | Quinnell | 98/42.21 |
| 4,817,506 | A | * | 4/1989 | Cashman | 454/365 |
| 4,843,953 | A | | 7/1989 | Sells | 98/42.21 |
| 4,899,505 | A | | 2/1990 | Williamson et al. | 52/199 |
| 4,903,445 | A | | 2/1990 | Mankowski | 52/199 |
| 4,924,761 | A | | 5/1990 | MacLeod et al. | 98/42.21 |
| 4,957,037 | A | | 9/1990 | Tubbesing et al. | 98/42.21 |
| 5,009,149 | A | * | 4/1991 | MacLeod et al. | 454/365 |
| 5,035,172 | A | | 7/1991 | Waggoner | 98/37 |
| 5,052,286 | A | | 10/1991 | Tubbesing et al. | 98/42.21 |
| 5,054,254 | A | | 10/1991 | Sells | 52/199 |
| 5,060,431 | A | | 10/1991 | MacLeod et al. | 52/199 |
| 5,070,771 | A | | 12/1991 | Mankowski | 454/275 |
| 5,081,914 | A | | 1/1992 | Mejia | 454/367 |
| 5,092,225 | A | | 3/1992 | Sells | 454/365 |
| 5,095,810 | A | | 3/1992 | Robinson | 454/365 |
| 5,112,278 | A | | 5/1992 | Roberts | 98/365 |
| 5,122,095 | A | | 6/1992 | Wolfert | 454/365 |
| 5,149,301 | A | | 9/1992 | Gates | 454/365 |
| 5,167,579 | A | | 12/1992 | Rotter | 454/365 |
| 5,170,014 | A | * | 12/1992 | Borsh | 174/53 |
| D336,952 | S | | 6/1993 | Raneo | D23/393 |
| 5,304,095 | A | | 4/1994 | Morris | 454/365 |
| 5,339,582 | A | | 8/1994 | Sells | 52/198 |
| 5,355,644 | A | | 10/1994 | Guhl et al. | 52/200 |
| 5,425,672 | A | | 6/1995 | Rotter | 454/365 |
| 5,458,538 | A | * | 10/1995 | MacLeod et al. | 454/365 |
| 5,487,247 | A | | 1/1996 | Pigg | 52/302.3 |
| 5,498,205 | A | | 3/1996 | Knowles et al. | 454/363 |
| 5,549,513 | A | | 8/1996 | Thomas et al. | 454/365 |
| 5,600,928 | A | | 2/1997 | Hess et al. | 52/309.4 |
| 5,630,752 | A | | 5/1997 | Gubash | 454/366 |
| 5,655,964 | A | | 8/1997 | Rheault et al. | 454/368 |
| 5,704,834 | A | | 1/1998 | Sells | 454/365 |
| 5,738,581 | A | | 4/1998 | Rickert et al. | 454/365 |
| 5,749,780 | A | | 5/1998 | Harder et al. | 454/359 |
| 5,772,502 | A | | 6/1998 | Smith | 454/365 |
| 5,860,256 | A | | 1/1999 | Humber | 52/219 |
| 5,867,956 | A | | 2/1999 | Gregory, Jr. et al. | 52/309.13 |
| 6,165,066 | A | * | 12/2000 | Sharp et al. | 454/273 |
| 6,174,119 | B1 | * | 1/2001 | Orr | 411/461 |
| 6,793,574 | B1 | * | 9/2004 | Robinson | 454/365 |

* cited by examiner

RIDGE VENTILATION SYSTEM

Matter enclosed in heavy brackets [ ] appears in the original patent but forms no part of this reissue specification; matter printed in italics indicates the additions made by reissue.

This is a continuation of U.S. patent application Ser. No. 09/412,909 filed on Oct. 5, 1999, now U.S. Pat. No. 6,227,963.

TECHNICAL FIELD

This invention relates generally to attic ventilation and more specifically to ridge vent systems for ventilating an attic space through and elongated opening along the ridge of a roof.

BACKGROUND

It is an important consideration when designing modern buildings such as homes and offices that the attic space of the building be well ventilated. Such ventilation reduces the searing heat that can build up in the attic during summer months and substantially reduces cooling costs and other problems associated with such heat. Numerous devices have evolved over the years for providing attic ventilation. Such devices include simple gable vents to provide cross ventilation, passive roof vents located at strategic positions along the slop of a roof, and active roof ventilation systems, which traditionally include thermostats that activate fans above a predetermined temperature to force hot air out of the attic.

More recently, ridge ventilation or ridge vent systems have become popular for ventilating the attic space of a building. Ridge vent systems generally include a long opening formed along the apex or ridge of a gable roof through which hot air, which naturally rises, can escape the attic. A long ridge vent assembly spans the length of and covers the opening and is designed to allow air to escape while preventing rain water from entering through the opening along the ridge. Early ridge vents were simple corrugated covers that were attached to the roof covering the ridge opening with traditional ridge cap shingling being applied over the covers.

Recently, more sophisticated ridge vents have been developed. Many of these more sophisticated vents include injection molded vent sections that are attached to the roof end-to-end to span and cover the opening along the open ridge of the roof. The vent sections generally have transversely flexible center panels flanked along either edge with a vent grate. The center panel is held a short distance above the roof by depending supports to define a space between the panels and the roof and the vent grates extend generally downwardly from the edges of the panels to engage the roof. Some systems include upstanding wind baffles outboard of the vent grates. These baffles generate low-pressure vortices in the region of the vent grates as a breeze blows across the roof to draw hot air from beneath the vent sections to ventilate the attic. Once installed, ridge cap shingling is installed over the center panel portions of the ridge vent sections. Since rain water can collect in the trough between the vent grates and the wind baffle, many ridge vents are provided with weep holes located at intervals along this trough to allow the water to escape and flow down the roof.

While modern ridge vent systems are an improvement over early ridge vents, they nevertheless are plagued with a variety of problems and shortcomings inherent in their respective designs. For example, since the individual ridge vent sections that form the long ridge vent are attached to the roof one at a time and simply positioned against an adjacent section, they can easily be attached in such a way that their ends do not meet well and gaps are formed at the junctions between adjacent sections. This can result in a skewed or otherwise non-straight final vent assembly and can lead to leaks at the junctions between the vent sections. Further, the careful alignment and attachment of the ridge vent sections to the roof can be a tedious and time consuming task requiring some skill to master. This is undesirable for roofers, who generally desire to work as fast as possible.

Other problems with existing ridge vent systems include the tendency of rain water to be blown through the weep holes, through the vent grates, and into the open ridge of the roof during rain storms or other blowing rains. Also, since the vent sections are supported from three-quarters of an inch to an inch above the roof, standard roofing nails are not long enough to attach the sections to the roof. Special long nails are required. This means that a roofer must stock a supply not only of standard roofing nails but also of long roofing nails for attaching the ridge vent sections to the roof and for attaching ridge cap shingles atop the ridge vent. This can be a problem if, for instance, a roofer forgets to stock the special nails or runs out during installation of the ridge vent sections. The entire roofing project can be held up in these circumstances until a supply of the special long roofing nails can be obtained. Finally, even when the vent sections are carefully joined together, water leaks can still occur at the junctions between the vent sections, especially as the ridge cap shingles age and begin to leak.

Accordingly, there continues to exist a need for an improved ridge vent system that addresses and solves the problems associated with current systems. Such an improved system should be easier and quicker to install than current systems, should eliminate water leakage at vent section junctions and through the weep holes of the vent sections, and should eliminate the need for roofers to stock and maintain special roofing nails designed to attach the vent sections to a roof. It is to the provision of such an improved ridge vent system that the present invention is primarily directed.

SUMMARY OF THE INVENTION

Briefly described, the present invention, in one preferred embodiment thereof, comprises a unique and improved ridge vent system for ventilating the attic space beneath the roof of a building. The ridge vent system is designed to span and cover the open ridge of the roof and is formed from a plurality of elongated preferably injection molded ridge vent sections having ends. The ridge vent sections are sized to cover and extend the length of the open ridge of a roof when the sections arrayed end-to-end along the ridge. Each ridge vent section is formed with a laterally flexible central panel having edges and a width sufficient to cover the open ridge of a roof. Support ribs project downwardly from the central panel for supporting the central panel above and spaced from the roof. A ventilation grid extends along at least one edge and preferably both edges of the central panel for allowing air to escape from beneath the central panel to ventilate the attic space beneath the roof. Upstanding wind baffles flank the ventilation grids for creating low pressure vortices during a breeze to draw air through the ventilation grids for enhancing ventilation of the attic.

Attachment means are formed on the ends of each ridge vent section for attaching a plurality of ridge vent sections together in end-to-end relationship to form a ridge vent structure sufficiently long to extend the length of and cover the open ridge of the roof. In the preferred embodiment, the attachment means comprises a pair of tabs projecting from end of each ridge vent section and a corresponding pair of slots formed on the other end of each ridge vent section for receiving the tabs of an adjacent ridge vent section. Mating latches are formed on the ends of the ridge vent sections to lock the sections together when the tabs of one section are fully received in the slots of an adjacent section. Thus, the sections can be joined and locked securely together in end-to-end relationships.

Drain means in the form of a laterally extending trough is formed on one end of each ridge vent section. The trough is sized and positioned such that it underlies the junction between its vent section and an adjacent vent section when the sections are joined together. In the event of water seepage at the junction, the water is captured in the trough underlying the junction and directed laterally to the edges of the section and away from the open ridge of the roof. In this way, if a leak develops in the ridge cap shingles, water does not leak through the ridge vent system and into the attic.

Each ridge vent section is further formed with end walls that project downwardly from the central panel of the vent section adjacent each end thereof. The end walls isolate the individual vent sections to prevent cross ventilation along the length of a ridge and, more importantly, for the ridge vent sections at the ends of a long ridge vent system, prevents rain from being blown through the ends of the sections. In order that the end walls not interfere with the lateral flexibility of the central panels of the sections, they are formed at least partially by an array of mutually interlocked alternately oriented Omega-shaped end wall sections that deform as the central panel is flexed to conform it to the pitch of a roof during installation.

A drain trough is defined between the ventilation grid and the upstanding outboard wind baffle of each ridge vent section. The trough receives rain water shed from the ridge cap shingles. A plurality of weep holes are located at spaced intervals along the wind baffles to allow collected water to flow out of the drain trough and onto the roof. An array of upstanding barriers are formed in the drain trough with each barrier of the array being aligned with a corresponding one of the weep holes. The barriers block rainwater that otherwise might be blown through the weep holes, into the ventilation grid, and into the open ridge of the roof in a rainstorm and thus prevent leakage into the attic that sometimes can occur with prior art ridge vents in severe storms.

The upstanding outboard wind baffles are supported by an array of spaced buttresses. Each of the buttresses is shaped to define a pair of slots sized to receive and releasably hold a pair of special roofing nails needed to secure the ridge vent sections to the roof and to secure ridge cap shingles over the ridge vent sections. As a roofer secures the ridge vent system of this invention to the ridge of a roof, the special roofing nails needed are provided and readily available. The roofer need only remove the nails from the buttresses as they are required. Preferably, a sufficient number of nails are provided on each ridge vent section to attach the section to the roof and to attach ridge cap shingles over the central panel of the section. Thus, the roofer is freed from the responsibility of stocking and maintaining the required special roofing nails and a sufficient number of such nails is always readily available as the ridge vent system is installed and covered with ridge cap shingles.

Thus, a unique and significantly improved ridge vent system is now provided that successfully addresses the problems and shortcomings of the prior art. With the ridge vent system of this invention, ridge vent sections are securely joined together in end-to-end relationship to form the long ridge vent before being attached to the roof. Accordingly, the entire vent system can be accurately positioned as one unit along the ridge and skewed joints between sections are eliminated. Water seepage through the ridge cap shingles is shed away from the junctions between sections to eliminate leakage into an attic and a unique flexible end wall on the sections prevents rain from being blown into the ends of the ridge vent system. Further, since the special roofing nails required for installation of the system are carried by the ridge vent sections themselves, roofers are freed from the responsibility of stocking the special nails. These and other features, objects, and advantages of the present invention will become more apparent upon review of the detailed description set forth below taken in conjunction with the accompanying drawing figures, which are briefly described as follows.

DETAILED DESCRIPTION OF THE PREFERRED EMBODIMENT

Figure 1:
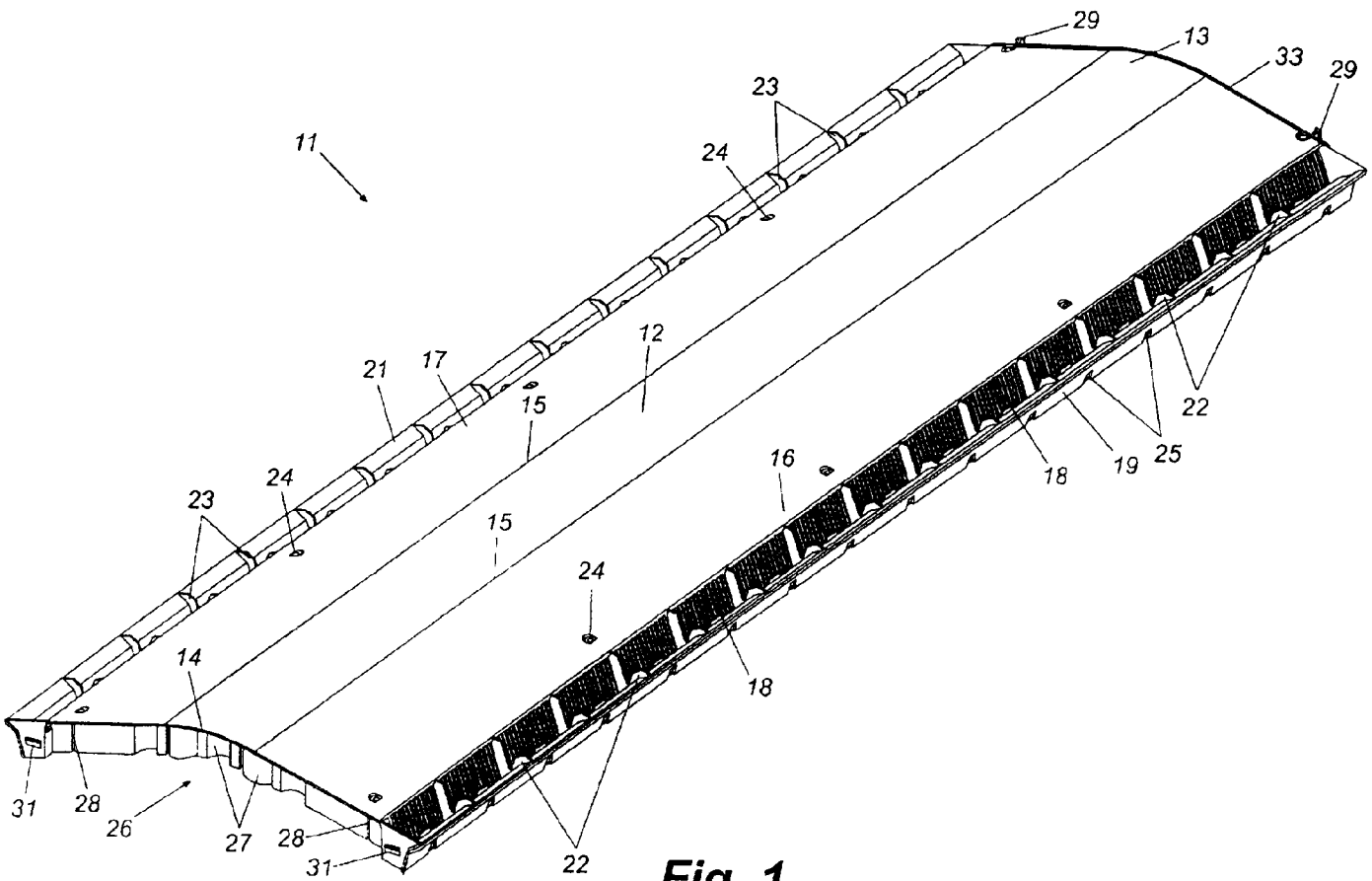
FIG. 1 is a perspective view of a ridge vent section that embodies principles of the present invention in a preferred form.

Referring now in more detail to the drawing figures, wherein like reference numerals refer to like parts throughout the several views, FIGS. 1 through 7 illustrate one preferred embodiment of a ridge vent section that, when joined end-to-end with like sections, forms the ridge vent system of this invention. The ridge vent section 11 preferably is injection molded from appropriate ABS or PVC plastic material and comprises an elongated central panel 12 having ends 13 and 14 and edges 16 and 17. The central panel 13 is sufficiently thin to be laterally flexible across its width so that the vent section can be flexed or bent into a generally inverted V or U shape to conform the vent section to the pitch of a roof at the ridge thereof. In this way, the ridge vent section can be attached to a roof covering the open ridge of the roof. To enhance the flexibility of central panel 12, score lines 15 can be formed along the length of the panel if desired, although such score lines are optional and need not be present for the panel to be flexed. When attached to a roof covering the ridge thereof, the central panel is held a predetermined distance such as, for example, three fourths of an inch to an inch, above the roof by a set of support ribs 38 (FIG. 4) that depend from the underside of the central panel 12.

A ventilation grid 18 is formed along the edge 16 of the central panel and extends generally downwardly therefrom. As better illustrated in FIG. 2, the ventilation grid 18 is formed by a plurality of spaced apart ribs that define openings through which hot air entering the space beneath the central panel from the attic can escape into ambiance. A grid structure other than downwardly extending spaced ribs might also be employed so long as the aggregate area of the openings is sufficient to provide free flow of air from beneath the central panel. A ventilation grid 18 is also formed along the other edge 17 of the central panel and is formed with the same configuration as the grid that is visible in FIG. 1. Alternatively, a ventilation grid might only be formed along one edge of the central panel if desired to accommodate other types of roofs such as hip roofs or to provide ventilation at a location other than along the ridge of a roof. However, the preferred embodiment described herein is intended for use as a ridge vent along the apex of a gable roof and thus is provided with ventilation grids along both edges.

The ridge vent section 11 is further formed with upstanding wind baffles 19 and 21 located along and outboard of the ventilation grids 18. These wind baffles have been found to generate relatively low pressure vortices in the regions of the ventilation grids during even mild breezes blowing across a roof. Such lower pressure regions function to draw air through the ventilation grids and significantly enhance the air flow through the open ridge of the roof to improve ventilation of the attic. In the illustrated embodiment, the wind baffles are formed with a bottom section and a top section that is outwardly angled with respect to the bottom section. While this design functions well, other baffle designs are also possible within the scope of the present invention.

Figure 2:
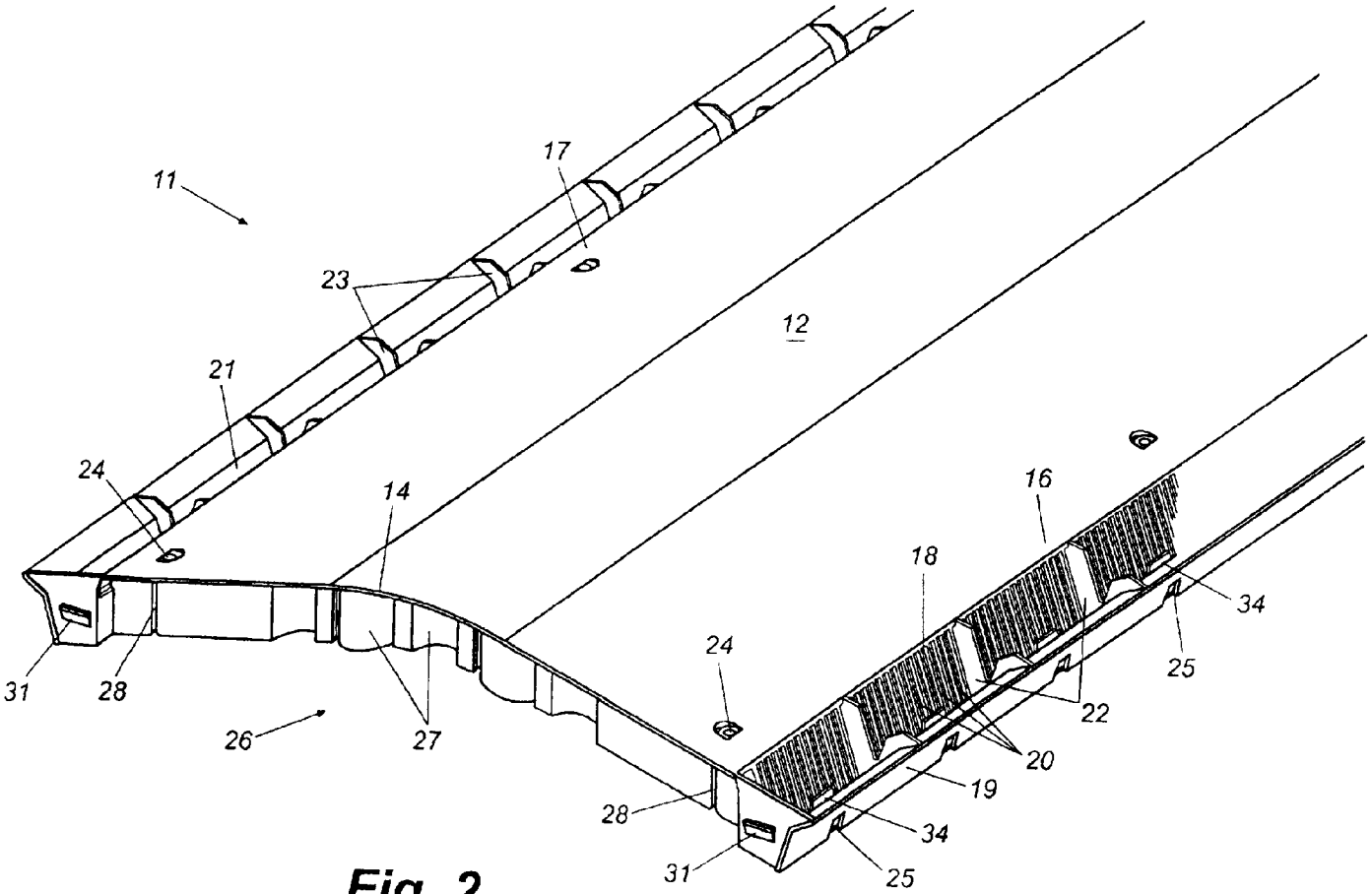
FIG. 2 is a perspective view of one end of the ridge vent section of FIG. 1.
Figure 3:
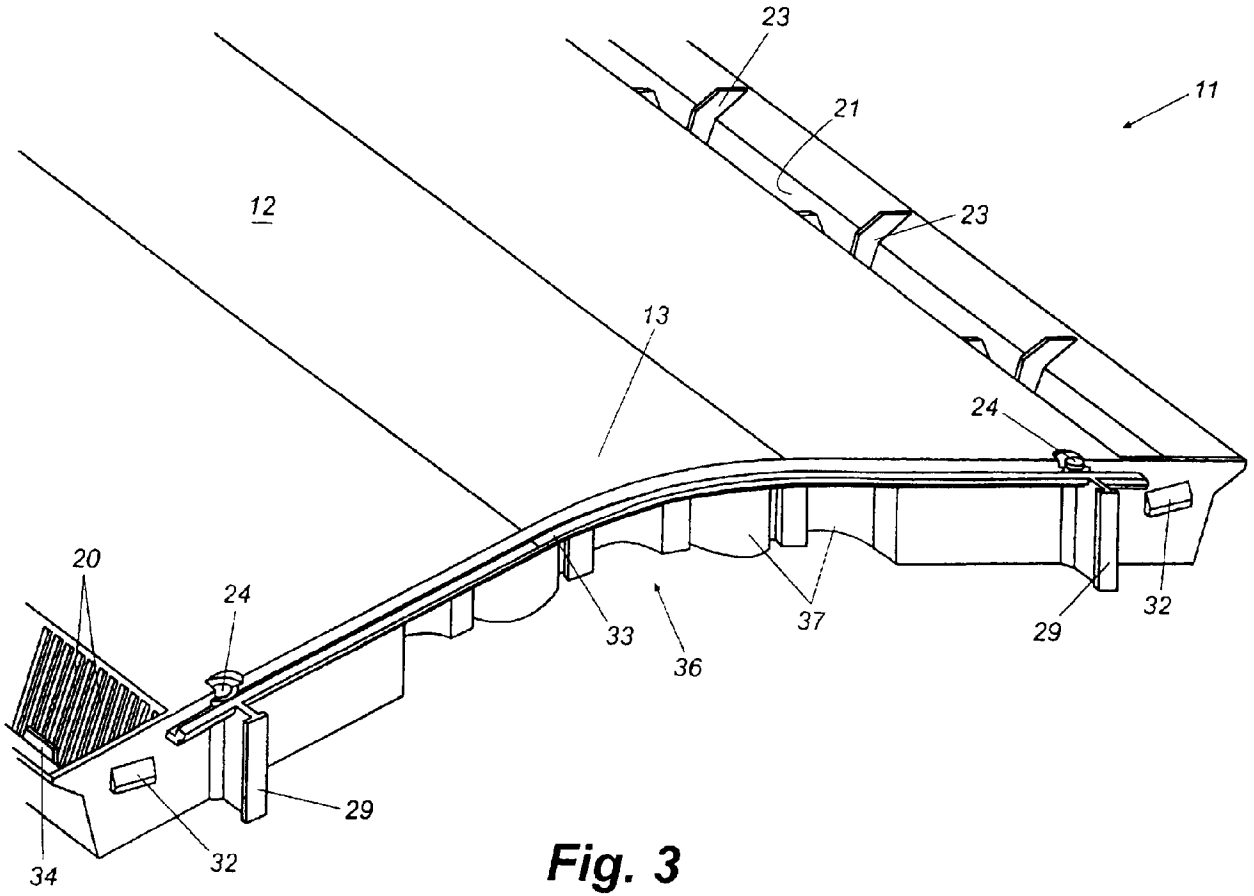
FIG. 3 is a perspective view of the opposite end of the ridge vent section of FIG. 1.
Figure 7:
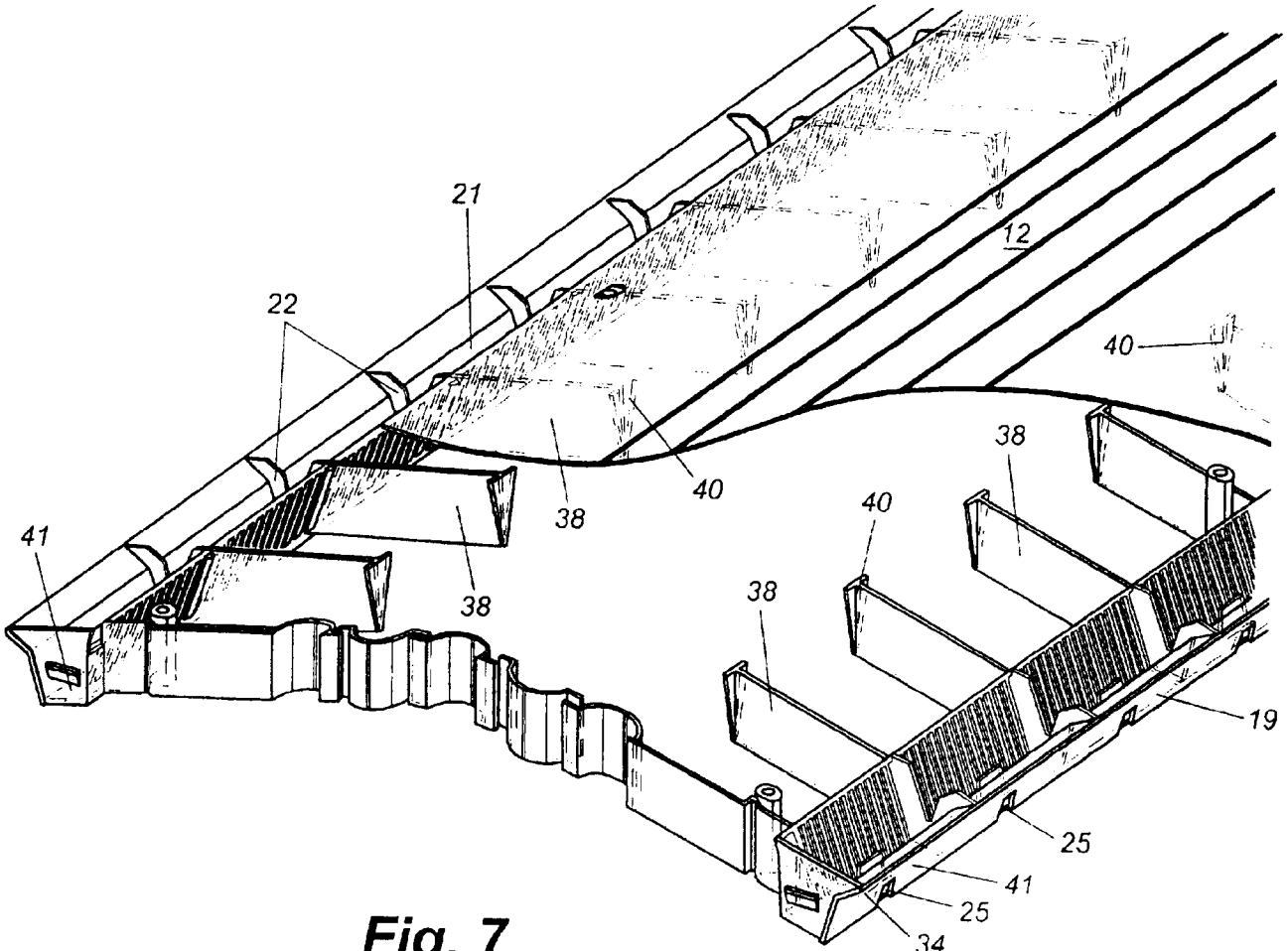
FIG. 7 is a perspective view of one end of the ridge vent section of FIG. 1 with hidden lines visible to illustrate the various elements of the section.
Figure 8:
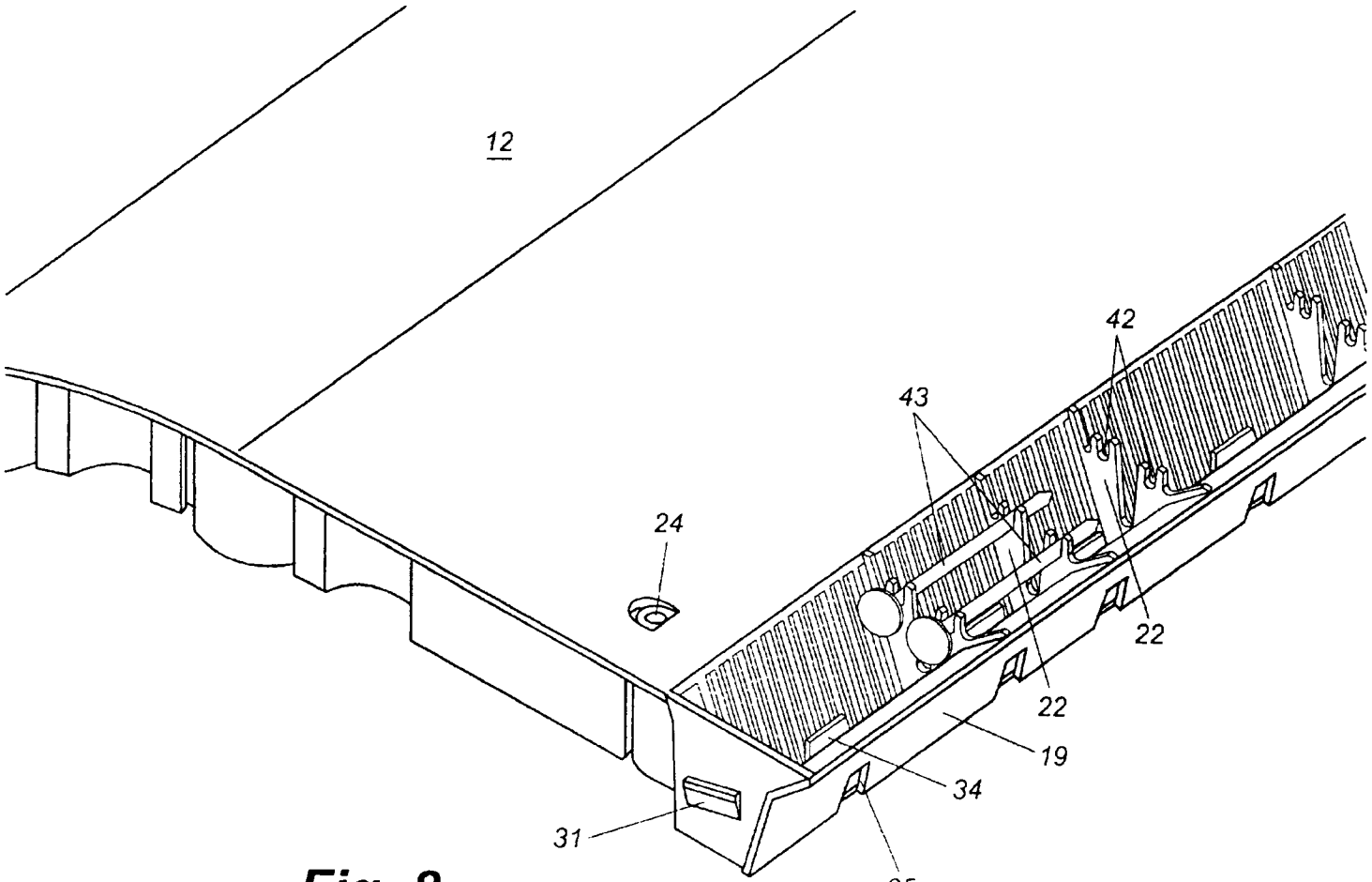
FIG. 8 is a perspective view of a portion of the ridge vent section of FIG. 1 illustrating the ventilation grid, weep holes, upstanding barriers, and buttresses formed to hold special roofing nails.

As best seen in FIG. 7, a drain trough is formed between the ventilation grids and their respective wind baffles and each drain trough preferable has a narrow flat floor 41 that extends between the bottom of each ventilation grid and the bottom of its wind baffle. The flat floor adds stability and provides a secure foot upon which the rent section rests when attached to a roof. The wind baffles are supported by an array of spaced buttresses 22, which extend between each ventilation grid and its wind baffle to support and reinforce the wind baffle. The buttresses 22 preferably are extensions of the support ribs 38 (FIG. 7) to provide enhanced strength and to promote plastic flow during the injection molding process, although this is not a requirement of the invention. The buttresses 22 can be formed in any convenient shape, one of which is illustrated in FIGS. 1 through 3. Most preferably, however, the buttresses are shaped to receive and hold special roofing nails, as illustrated in FIG. 8 and as described in greater detail below.

Rainwater that falls on the ridge cap shingles covering the central panel 12 when the ridge vent system of this invention is installed spills into the drain trough between the ventilation grids 18 and their respective wind baffles. An array of weep holes 25 are formed along the bottom edge of the wind baffles 19 to allow this water to escape from the drain trough and onto the roof to be drained away. As illustrated in FIG. 2, an array of upstanding barriers 35, project upwardly from the floor 41 of the drain trough with each of the barriers 34 being located adjacent to and aligned with a corresponding one of the weep holes 25. During a rainstorm, high winds can tend to drive water through the weep holes 25. When this occurs, the blowing water encounters the barriers 34 and is disrupted and disbursed by the barriers so that it can drain back onto the roof through the weep holes 25. Thus, the barriers 34 prevent windblown rain from entering through the weep holes, through the ventilation grid, and into the open ridge of a roof into the attic below.

Figure 6:
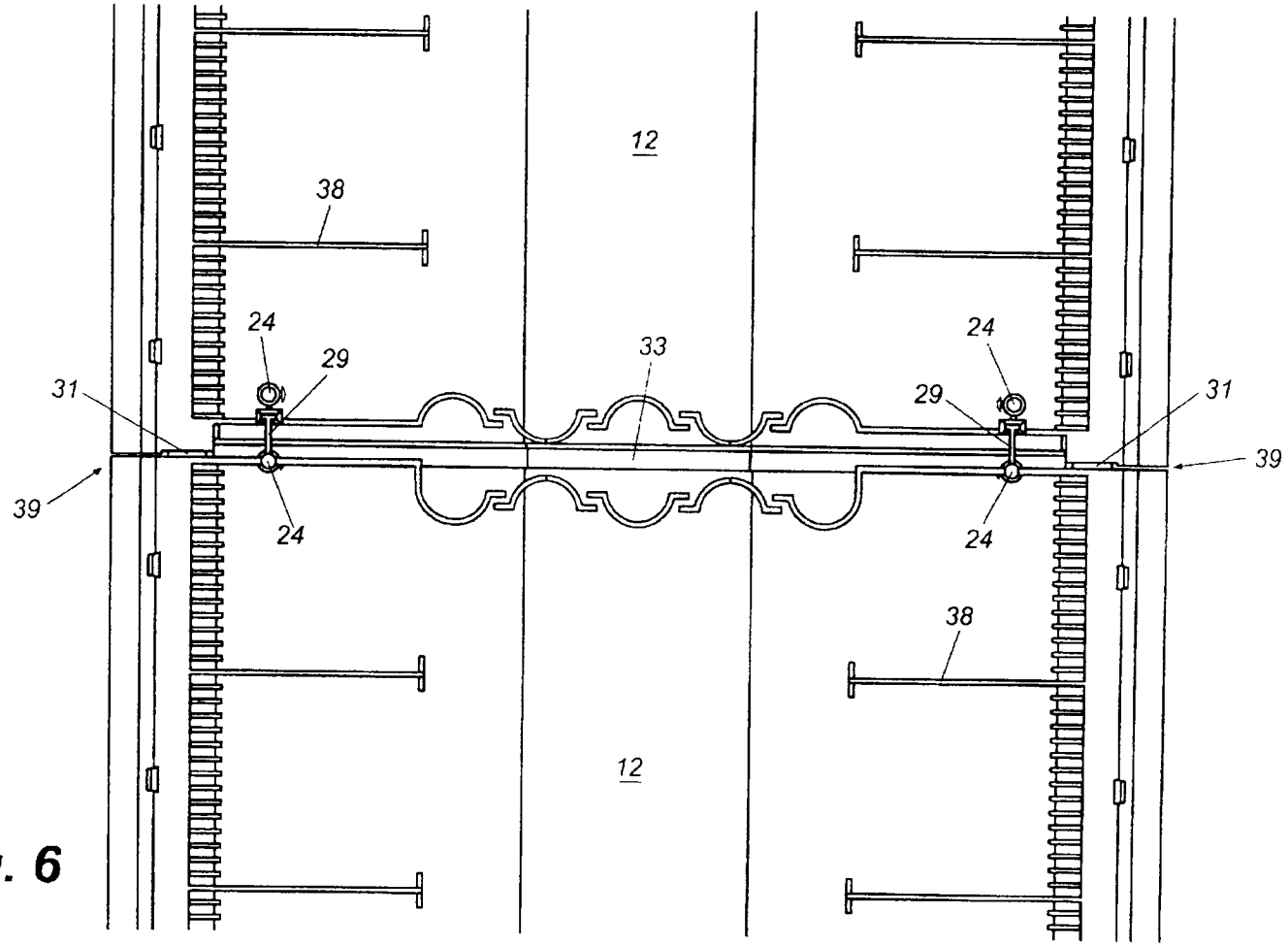
FIG. 6 is a bottom plan view illustrating two ridge vent sections joined together at respective ends to form a part of the ridge vent system of this invention.

Attachment means are formed on the ends of the vent section 12 for attaching vent sections together in end-to-end relationship to form a ridge vent system sufficiently long to span the open ridge of a roof. In the preferred embodiment, the attachment means comprises a pair of slots 28 formed at one end 14 of the vent section and a corresponding pair of tabs 29 projecting from the other end 13 of the section. The slots 28 are well illustrated in FIGS. 2 and 4 and the tabs are well illustrated in FIGS. 3 and 5. The slots 28 are positioned and oriented to be pressed onto and capture the tabs of an adjacent vent section as best illustrated in FIG. 6 to attach two vent sections securely together at their ends.

Upwardly facing wedge-shaped latches 31 (FIG. 2) are formed on the one end 14 of the vent section and oppositely or downwardly facing wedge-shaped latches 32 (FIG. 3) are formed on the other end 13 of the vent section. These oppositely facing latches are positioned and configured for mutual latching engagement with each other when the tabs 29 of one vent section are fully received into the slots 28 of an adjacent joined vent section to lock the two sections together (See FIG. 6). In this way, when the vent sections are joined end-to-end by means of their slots and tabs, they become securely locked together by the latches. This is highly advantageous when installing a long multi-section ridge vent system because all of the sections of the system can be securely attached together at their ends and the entire unit can then be positioned and properly adjusted along the open ridge of a roof before being fastened to the roof. This represents an improvement over prior art installation methods wherein each section is attached to the roof independently, which can result in skewed or misaligned sections and in junctions between sections that are not tight.

Figure 4:
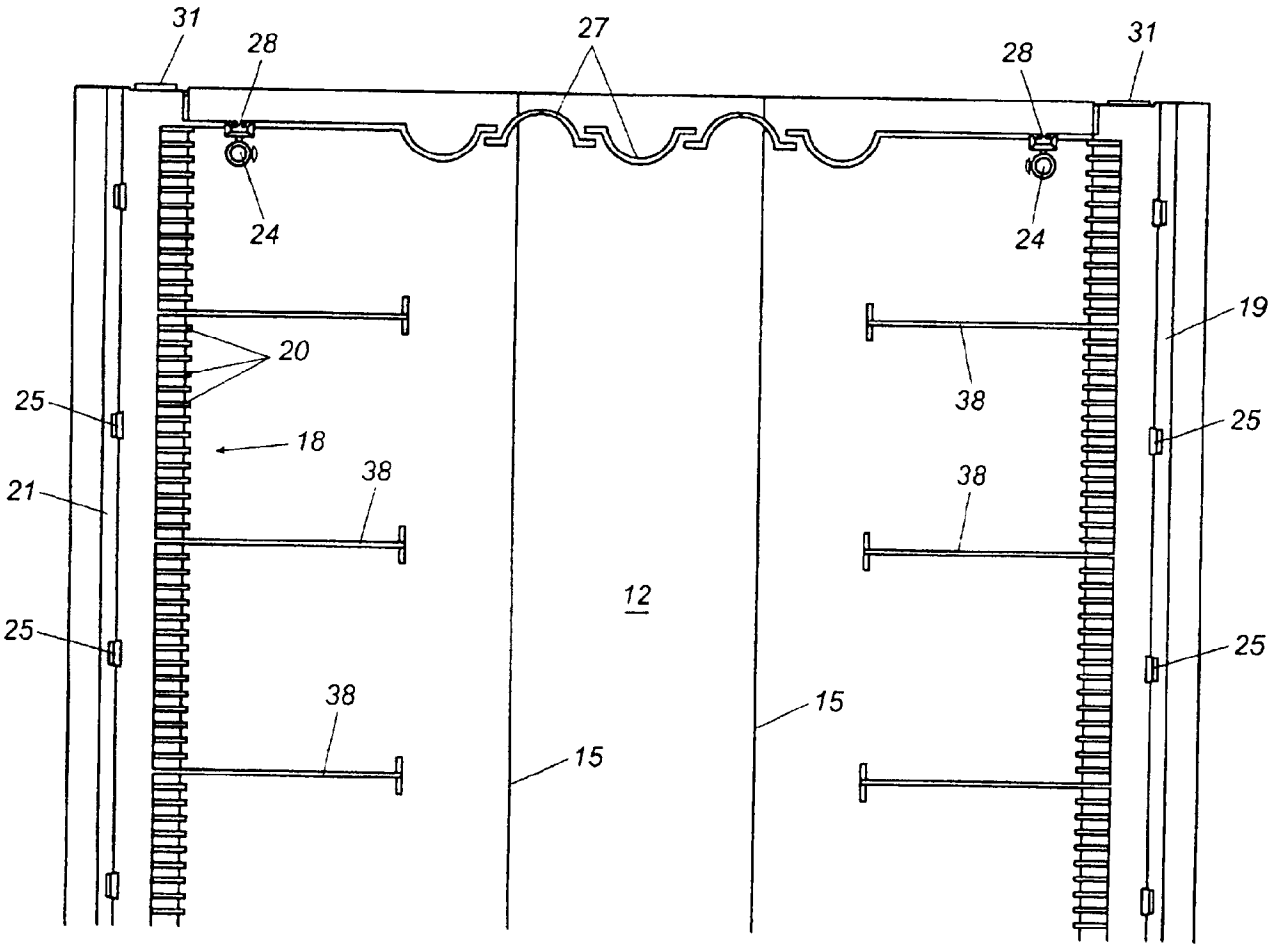
FIG. 4 is a bottom plan view of one end of the ridge vent section of FIG. 1.
Figure 5:
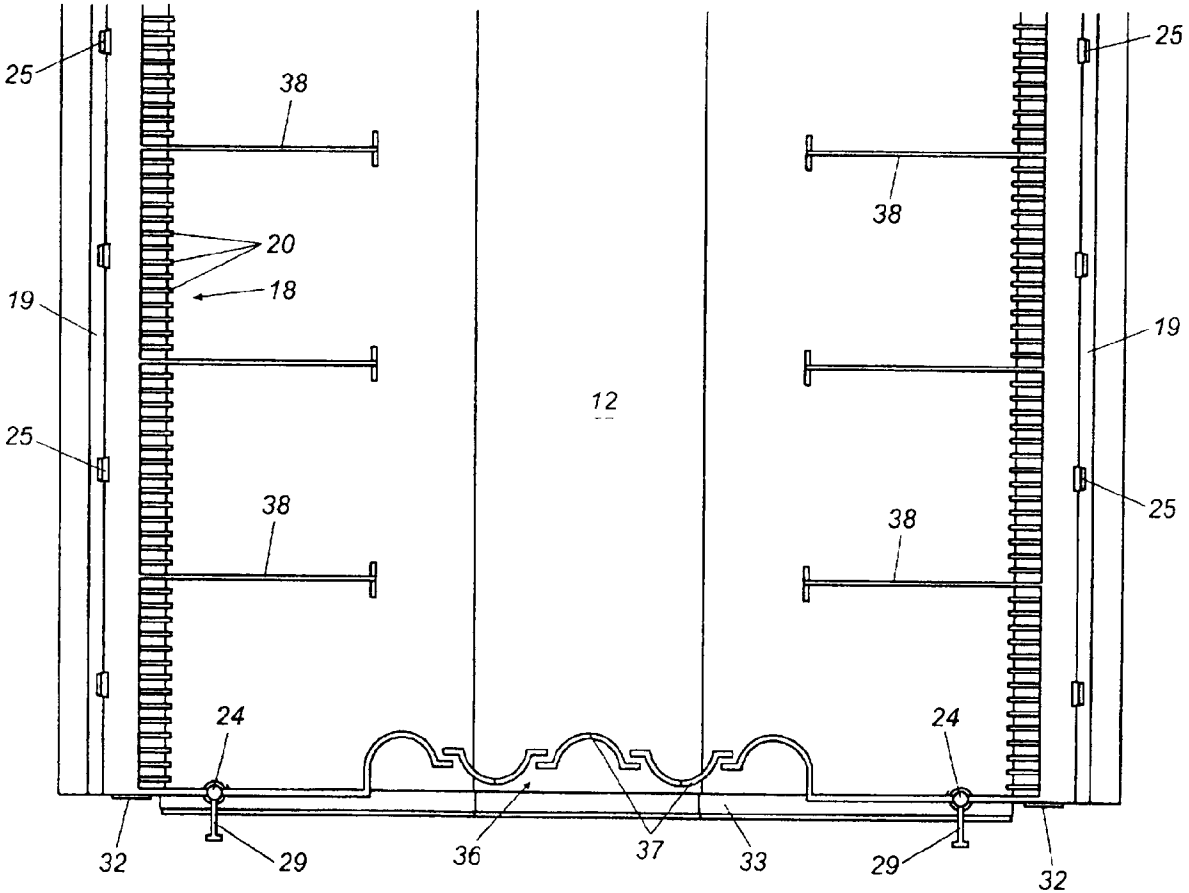
FIG. 5 is a bottom plan view of the opposite end of the ridge vent section of FIG. 1.

A downwardly extending end wall 26 is formed adjacent the one end 14 of the vent section 12. The end wall 26 functions both to isolate joined vent sections from each other to inhibit cross-ventilation and to provide a barrier against windblown rain at the ends of a long ridge vent formed of connected ridge vent sections. The central portion of the end wall 26 is defined by an array of oppositely oriented generally Omega-shaped sections 27 that are mutually interlinked as best illustrated in FIG. 4. Since the Omega-shaped sections are interlinked and partially overlap as shown, they present a continuous barrier to windblown rain to prevent the rain from being blown beneath the extreme end section of an array of joined vent sections. In this regard, the end wall prevents leakage under the ridge vent system and into the open ridge of a roof.

In addition to preventing leakage at the ends of a long vent assembly, the interlinked Omega-shaped sections allow the central panel 12 of each section to be flexed to cover the ridge of a roof and conform to the pitch of the roof on either side thereof. Specifically, as the central panel is flexed, the free ends of the Omega-shaped sections engage each other. As the panel is flexed further, the curved or arched portions of the Omega-shaped sections, because of their curved shape, compress to smaller diameters as required to accommodate the flexing of the panel. The result is an end wall that is substantially impervious to windblown rain while at the same time accommodating the full range of flexing necessary to conform the ridge vent section to the pitch of a roof.

As illustrated in FIG. 3, a similar depending end wall 36 is formed adjacent the other end 13 of each ridge vent section. The end wall 36 is similar in all respects to the end wall 26 and has a central portion that is defined by an array of mutually interlocking generally Omega-shaped sections 37. As with Omega-shaped section 27, the Omega-shaped sections 37 present a substantially impervious barrier to wind blown rain at the other end of a ridge vent assembly while at the same time accommodating flexing of the ridge vent sections to conform the sections to the pitch of a roof to which they are attached.

A transversely extending drain member 33 is formed at the end 13 of each of the ridge vent sections (best illustrated in FIG. 3). The drain member 33 is configured to define a small trough that is positioned to underlie the junction between two adjacent ridge vent sections when the sections are joined together by means of the attachment tabs 29, slots 28, and latches 32. While the junction between two such joined sections is held together relatively tightly by these attachment mechanisms, water that may seep under the ridge cap shingles covering the central panel of the ridge vent may nevertheless leak through one or more of the junctions. In this event, the water is captured in the underlying trough of the drain member 33, which directs the water toward the edges of the ridge vent where it simply is deposited on the shingles of the roof and shed away. Accordingly, leakage at the junctions of joined together ridge vent sections is eliminated and the possibility of a leak through the open ridge and into the attic below is eliminated.

FIG. 7 best illustrates the configuration of the downwardly projecting support ribs 38, which support the central panel 12 of each ridge vent section a predetermined distance above a roof to which the sections are attached. The support ribs 38 are seen to extend inwardly a predetermined distance from the ventilation grids of the ridge vent section, where they terminate in wedge-shaped stabilization fins 40. The stabilization fins 40 reinforce the free ends of the support ribs 38 to prevent bending thereof and are wedge-shaped to present a minimum obstruction to the flow of air from beneath the central panel toward the ventilation grids of the ridge vent section.

As mentioned above, and as shown clearly in FIG. 7, the buttresses 22, which support the wind baffles 19 and 21, preferably are formed as extensions of the support ribs 38 for increased strength and enhanced material flow during the injection molding process. Nail holes 24 are formed along the length of each ridge vent section for attaching the section to a roof with special extra-long roofing nails. As illustrated in FIG. 7, these nail holes preferably, but not necessarily, are formed at and as a part of selected ones of the support ribs 38. In this way, the nail holes are reinforced by and reinforce the support ribs and extend all the way to a roof so that the ridge vent panel is securely attached but not deformed when nails are driven firmly into a roof through the nail holes 24.

FIG. 8 illustrates yet another unique feature of the present invention. As discussed above, one problem with prior art ridge vent systems is that their installation requires special extra-long roofing nails, which roofers must stock and maintain specifically for attaching ridge vent sections to a roof and for attaching ridge cap shingles over the top of the ridge vent sections. The present invention eliminates this burden on roofers by providing the required special nails on the ridge vent sections themselves.

Referring to FIG. 8, the buttresses 22, which support the wind baffles, are formed with at least one and preferably a pair of upwardly projecting slots 42 that are slightly narrower than the girth of a nail 43. These specially shaped buttresses are spaced apart along the ridge vent section a distance slightly shorter than the length of the nails. During the manufacturing process, pairs of special roofing nails 43 required to attach the ridge vent section to a roof are inserted in the slots 42 of adjacent buttresses 22 as illustrated. Since the slots 42 are slightly narrower than the nails 43, the nails are held firmly but removably in place within the slots, preferably in side-by-side relationship as shown.

In practice, a sufficient number of nails are provided to attach one ridge vent section to a roof and to attach the requisite number of ridge cap shingles to the roof covering the central panel of the ridge vent section. During installation, a roofer need only position the ridge vent along the ridge of a roof, adjust its position properly, and attach it to the roof by removing nails as required from their slots on the buttresses and driving them into the roof through the nail holes 24 of the ridge vent sections. When ridge cap shingles are to be attached over the central panels of the ridge vent sections, a sufficient number of nails remain and again are removed and used as needed to attach the ridge cap shingles.

While the nails are shown carried by the buttresses in FIG. 8, it should be understood by those of skill in the art that the nails might just a well be carried on the ridge vent sections in other ways such as, for example, by being taped to the bottom or top of each section or otherwise attached to the panels. Nevertheless, locating the nails on the buttresses as shown is considered by the inventor to be the best mode of carrying out the invention.

The ridge vent system described above is used as follows to provide attic ventilation. First, the ridge of the roof is left open or cut to form an opening having a width less than the width of the central panel of the ridge vent sections and having a predetermined length. A plurality of ridge vent sections are then joined together in end-to-end relationship to form a ridge vent assembly sufficiently long to span the open ridge of the roof. The ridge vent assembly is then positioned and adjusted on the ridge of the roof. When properly positioned, the ridge vent assembly is attached to the roof by removing nails as required from their stowed positions on the buttresses and driving them through the nail holes in the ridge vent sections and into the roof. In this regard, the nail holes are located to fall on either side of the opening in the ridge of the roof so that the nails will find their marks in the roof decking on either side of the ridge opening.

When the ridge vent assembly is attached to the roof, ridge cap shingles are applied in the usual way covering the central panels of the joined ridge cap sections. For this purpose, a sufficient number of special length roofing nails remain in their berths on the buttresses to complete the ridge cap installation. With the ridge cap shingles applied, the ridge vent system is complete and superior roof ventilation is achieved.

The invention has been described herein in terms of preferred embodiments and methodologies. It will be understood by those of skill in the art, however, that a variety of additions, deletions, and modifications might well be made to the illustrated embodiments without departing from the spirit and scope of the invention as set forth in the claims.

What is claimed is:

[1. A ridge ventilation system comprising:

a plurality of ridge vent sections configured to be arranged end-to-end covering an open ridge of a roof;

each of said ridge vent sections having a laterally flexible central panel flanked by ventilation grids; and a plurality of fasteners removably secured to each of said ridge vent sections, said fasteners being positioned to be removed by an installer of said ridge ventilation system for use in fastening said ridge vent sections to a roof.]

2. [A ridge ventilation system as claimed in claim 1 and wherein] *A ridge ventilation system comprising:*

*a plurality of ridge vent sections each having ends and longitudinal edges and being configured to be arranged end-to-end covering an open ridge of a roof;*

*each of said ridge vent sections having a laterally flexible central panel flanked by ventilation grids that extend along and inboard of the longitudinal edges of the ridge vent; and*

*a plurality of fasteners located between the longitudinal edges of at least some of the ridge vent sections and being removably secured to the ridge vent sections at a series of first locations, said fasteners being positioned to be removed by an installer of said ridge ventilation system for use along said ridge vent sections at locations different from the first locations for fastening said ridge vent sections to a roof;* each of said ridge vent sections further [comprises] *comprising* wind baffles positioned outboard of said ventilation grids for creating a relatively low pressure region in the vicinity of said ventilation grids in response to a breeze blowing past said ridge vent section, said fasteners being removably secured to said ridge vent sections between at least one of said wind baffles and the corresponding ventilation grid.

3. A ridge ventilation system as claimed in claim 2 and wherein each of said wind baffles is supported by an array of buttresses extending between said wind baffle and the corresponding ventilation grid, at least some of said buttresses being configured for releasably holding said fasteners.

4. A ridge ventilation system as claimed in claim 3 and wherein said fasteners are nails and wherein said at least some of said buttresses are formed with notches sized to receive and removably secure said nails.

5. A ridge ventilation system as claimed in claim 2 and further comprising a drain trough formed between each of said ventilation grids and its corresponding wind baffle, weep holes formed along each of said drain troughs for promoting the escape of water from said drain troughs, and upstanding barriers positioned along said drain troughs and aligned with said weep holes for preventing rain from being blown through said weep holes and into said ventilation grids.

6. A ridge ventilation system as claimed in claim 5 and wherein said fasteners are removably secured to said ridge vent sections between at least one of said wind baffles and the corresponding ventilation grid.

7. A ridge ventilation system as claimed in claim 6 and further comprising an array of buttresses extending between at least one of said wind baffles and the corresponding ventilation grid for supporting said wind baffle, at least some of said buttresses being configured for releasably holding said fasteners.

8. A ridge ventilation system as claimed in claim 7 and wherein at least some of said buttresses are formed with notches sized to receive and removably hold said fasteners.

9. A ridge ventilation system as claimed in claim 8 and wherein said fasteners comprise nails.

10. A ridge ventilation system comprising:

a plurality of ridge vent sections *each having ends and longitudinal edges and being* configured to be arranged end-to-end covering an open ridge of a roof;

each of said ridge vent sections having a laterally flexible central panel flanked by ventilation grids; and a drain for diverting water that may seep into the junction between a pair of end-to-end ridge vent sections away from the open ridge of a roof;

said drain comprising a laterally extending trough *integrally* formed *on and extending* along one end of each of said ridge vent sections, said trough being sized and configured to underlie the junction between two joined ridge vent sections to receive water and divert the water toward said ventilation grids of said ridge vent sections.

[11. A ridge ventilation system as claimed in claim 10 and wherein said drain comprises a laterally extending trough formed along one end of each of said ridge vent sections, said trough being sized and configured to underlie the junction between two joined ridge vent sections to receive water and divert the water toward said ventilation grids of said ridge vent sections.]

12. A ridge ventilation system as claimed in claim 10 and further comprising a plurality of fasteners removably secured to each of said ridge vent sections *between the longitudinal edges thereof*, said fasteners being positioned to be removed by an installer of said ridge ventilation system for use in fastening said ridge vent sections to a roof.

13. A ridge ventilation system as claimed in claim 12 and wherein said plurality of fasteners are removably secured to each of said ridge vent sections along said ventilation grids thereof.

14. A ridge ventilation system as claimed in claim 13 and further comprising wind baffles positioned outboard of said ventilation grids for creating a relatively low pressure region in the vicinity of said ventilation grids in response to a breeze blowing past said ridge vent section, said fasteners being removably secured to said ridge vent sections between at least one of said wind baffles and the corresponding ventilation grid.

15. A ridge ventilation system as claimed in claim 14 and further comprising an array of buttresses extending between at least one of said wind baffles and the corresponding ventilation grid for supporting said wind baffle, at least some of said buttresses being configured for releasably holding said fasteners.

* * * * *